US010235599B2

(12) United States Patent
Li et al.

(10) Patent No.: US 10,235,599 B2
(45) Date of Patent: *Mar. 19, 2019

(54) METHOD AND SYSTEM TO CHARACTERIZE VIDEO BACKGROUND CHANGES AS ABANDONED OR REMOVED OBJECTS

(71) Applicant: Sensormatic Electronics, LLC, Boca Raton, FL (US)

(72) Inventors: Changchun Li, Concord, MA (US); Ian C. Westmacott, Tewksbury, MA (US); Mirko Ristivojevic, Cambridge, MA (US); Matthew A. Gruenke, Waltham, MA (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/026,783

(22) Filed: Jul. 3, 2018

(65) Prior Publication Data

US 2018/0330189 A1 Nov. 15, 2018

Related U.S. Application Data

(60) Continuation of application No. 14/962,533, filed on Dec. 8, 2015, now Pat. No. 10,043,105, which is a
(Continued)

(51) Int. Cl.
*G06K 9/62* (2006.01)
*H04N 7/18* (2006.01)
(Continued)

(52) U.S. Cl.
CPC ....... *G06K 9/6215* (2013.01); *G06K 9/00771* (2013.01); *G06K 9/52* (2013.01);
(Continued)

(58) Field of Classification Search
CPC ........ G06K 9/6215; G06T 7/254; G06T 7/215
See application file for complete search history.

(56) References Cited

U.S. PATENT DOCUMENTS 5,914,748 A * 6/1999 Parulski ................. H04N 5/272
348/239
2009/0060278 A1 3/2009 Hassan-Shafique et al.
(Continued)

OTHER PUBLICATIONS

Amag Technology, "SymmetryTM, EN-7500 Series Network Cameras, Video Content Analytics," Datasheet, Aug. 2010, 2 pages.
(Continued)

*Primary Examiner* — Nam D Pham
(74) *Attorney, Agent, or Firm* — HoustonHogle LLP (57) ABSTRACT

A method and system for analyzing video data in a security system. An analysis compares a current frame to a background model. The analysis system compares the background model to the current frame to identify changed pixel patches. The analysis system uses morphological image processing to generate masks based on the changed pixel patches. Next, the analysis system applies the masks to the background model and the current frames to determine whether the changed pixel patches are characteristic of abandoned or removed objects within the video data.

20 Claims, 10 Drawing Sheets

Related U.S. Application Data division of application No. 13/783,625, filed on Mar. 4, 2013, now Pat. No. 9,237,316.

(51) Int. Cl.

| | |
|---|---|
| *G06K 9/00* | (2006.01) |
| *G06K 9/52* | (2006.01) |
| *G06T 5/00* | (2006.01) |
| *G06T 7/20* | (2017.01) |
| *G06T 7/60* | (2017.01) |
| *G06T 7/215* | (2017.01) |
| *G06T 7/254* | (2017.01) |
| *G06T 7/194* | (2017.01) |
| *G06K 9/46* | (2006.01) |

(52) U.S. Cl.
CPC .............. *G06T 5/00* (2013.01); *G06T 7/194* (2017.01); *G06T 7/20* (2013.01); *G06T 7/215* (2017.01); *G06T 7/254* (2017.01); *G06T 7/60* (2013.01); *H04N 7/181* (2013.01); *G06K 2009/4666* (2013.01); *G06T 2207/10016* (2013.01); *G06T 2207/20036* (2013.01); *G06T 2207/30232* (2013.01)

(56) References Cited

U.S. PATENT DOCUMENTS

| | | | |
|---|---|---|---|
| 2009/0067716 A1 | 3/2009 | Brown et al. | |
| 2009/0238462 A1 | 9/2009 | Feris et al. | |
| 2009/0244390 A1* | 10/2009 | Feris | G06T 7/2053 348/701 |
| 2009/0279808 A1* | 11/2009 | Shiraishi | G06T 5/002 382/275 |

OTHER PUBLICATIONS

Bosch, "IVA 4.0 Intelligent Video Analysis," Bosh Security Systems 2012, Jun. 11, 2012, 3 pages.

Bosch, "Focus your attention, Bosch Intelligent Video Analysis," Bosh Security Systems, Inc., Aug. 2008, 12 pages.

Bosch, "IVA 5.60 Intelligent Video Analysis," Bosh Security Systems 2013, Apr. 23, 2013, 3 pages.

Connell, J, et al. Detection and Tracking in the IBM PeopleVision System. IBM, Jun. 27, 2004. 4 pages.

Ganz Digimaster, "16 CH 480 IPS Real-Time DVR 480 IPS," CBC (America) Corp. 2008, 4 pages.

International Preliminary Report on Patentability, dated Jun. 16, 2015, from counterpart International Application No. PCT/US2014/016282, filed on Feb. 13, 2014.

International Search Report and Written Opinion of the International Searching Authority, dated Jun. 4, 2014, from counterpart International Application No. PCT/US2014/016282, filed Feb. 14, 2014.

Liao, H-H. et al., "A Localized Approach to Abandoned Luggage Detection with Foreground-Mask Sampling," IEEE Computer Society, 2008, pp. 132-139.

Magno, M. et al., "Multimodal abandoned/removed object detection for lower power video surveillance systems," IEEE Computer Society, 2009, pp. 188-193.

Martiriggiano, T. et al., "An Innovative Approach for Abandoned or Removed Objects Detection," ISCCSP 2006, 4 pages.

San Miguel, J. C. et al., "Robust unattended and stolen object detection by fusing simple algorithms," AVSS08, 8 pages.

Tian Y., "Real-Time Detection of Abandoned and Removed Objects in Complex Environments," IBM T.J. Watson Research Center, 8 pages.

* cited by examiner

METHOD AND SYSTEM TO CHARACTERIZE VIDEO BACKGROUND CHANGES AS ABANDONED OR REMOVED OBJECTS

RELATED APPLICATIONS

This application is a Continuation of U.S. patent application Ser. No. 14/962,533, filed on Dec. 8, 2015, which is a Division of U.S. application Ser. No. 13/783,625, filed on Mar. 4, 2013, both of which are incorporated herein by reference in their entirety.

BACKGROUND OF THE INVENTION

Video security systems include security cameras and are often used for surveillance and video data analysis. These security systems are used to monitor buildings, lobbies, entries/exits, and secure areas within the buildings, to list a few examples. Additionally, the security systems are also used to monitor public areas such as garages, parking lots, building exteriors, and other areas in or around the buildings. Generally, these security systems are implemented to monitor usage but also to identify illegal activity such as theft or trespassing, to list a few examples.

Modern video security systems have the capability to analyze the video data captured by the security cameras. Typically, these systems are able to track individuals and possibly notify security personnel if unauthorized persons are entering (or exiting) a restricted area, for example. Additionally, the security systems also monitor objects within scenes. For example, abandoned objects (e.g., unattended backpacks or packages) should be identified in airport terminals, stadiums, or convention centers, for example. On the other hand, security personnel should be notified if objects are removed from a museum or if merchandise is removed from a retail establishment.

Abandoned or removed objects in scenes are identified using an analysis system. It analyzes the video data from the security cameras to generate a background model. The background model may be, for example but not limited to, a single video frame occurring prior to the background change, or an analysis of frames over time. Then current frames of video data from those security cameras are compared against the background model to identify changed pixel patches.

In one example, changed pixel patches were identified and used to mask a changed area in the current frames of video data relative to the background model. These changed pixel patches were used by the analysis system to conclude whether some part of the scene, such as an object in the scene, had changed. Next, the analysis system detected the number of edges in the changed area of the current frame and the background model. If there were more edges in the current frame than the background model, then the analysis system concluded that an object had been abandoned in the scene. In contrast, if there were fewer edges detected in the current frame than in the background model, then the analysis system concluded that an object had been removed from the scene.

In another example, the analysis system measured similarities between content inside and outside of the changed pixel patches in the current frame of video data. If the similarities were above a predefined threshold, then the analysis system concluded the object had been removed from the scene. Conversely, if the similarities of the content were below the predefined threshold, then the analysis system concluded the object had been abandoned in the scene.

In another example, the analysis system analyzed contours around the changed pixel patches in the current frame of video data. Then the analysis system compared the contours of the changed pixel patches to the edges detected in masked areas of the current frame. For each pixel patch or group of patches corresponding to an object, if similarities between the detected edges and the contours exceeded a predefined threshold, then the analysis system concluded that the object had been abandoned in the scene. If the similarities between the detected edges and the contours did not exceed the predefined threshold, then the analysis system concluded that the object had been removed from the scene.

SUMMARY OF THE INVENTION

These previous analysis systems were often unable to reliably distinguish between abandoned or removed objects in scenes. For example, the analysis systems often made mistakes in concluding whether an object had been abandoned or removed when the background had more texture than the object (e.g., a plate on a Persian rug). Likewise, the analysis systems also made mistakes comparing the similarity of content inside and outside of the changed pixel patches when contours of the changed pixel patches did not accurately match contours of the object (e.g., because of poor segmentation). Additionally, the analysis system often made mistakes comparing contours for the changed pixel patches to the edges detected in the masked area of the current image when the background has similar features as foreground objects. For example, a stack of similar items (e.g. newspapers or jeans) and then the top item is removed.

In the present solution, the analysis system performs an image subtraction operation between current frames and a background model to identify changed pixel patches. The analysis system then analyzes the changed pixel patches and detects edges in the background model that lie near a contour of the changed pixel patch and measures a strength of the detected edges. Next, the analysis system detects edges in the current frame that lie near the contour of the changed pixel patches and measures a strength of those detected edges. If the strength of the detected edges of the background model is greater than the strength of the detected edges of the current frame by a threshold, then the changed pixel patches are characterized as removed objects. If the strength of the edges of the background model is less than the strength of the edges of the current frame edges, then the changed pixel patches are characterized as abandoned objects.

Additionally, the present solution is beneficial because it does not require accurate segmentation, it does not assume relative edge density of foreground versus background image patches, and it does not assume an absolute image edge density. Therefore, the present solution is able to overcome many of the problems associated with previous analysis systems.

In general, according to one aspect, the invention features a method for analyzing video data in a security system. The method includes comparing a background model to at least one frame of the video data to identify at least one patch of changed pixels between the background model and the at least one frame. The method further includes generating masks based on the at least one patch of changed pixels that define contours around the at least one patch of changed pixels and applying the masks to the background model and the at least one frame to determine whether the at least one patch of changed pixels is characteristic of an abandoned object or a removed object.

In general, according to another aspect, the invention features a method for analyzing video data in a security system. The method includes comparing a background model to at least one frame of the video data to identify at least one patch of changed pixels between the background model and the at least one frame. The method further includes summing gradient magnitudes for edge pixels in the background model with respect to the at least one patch of changed pixels. Additionally, the method includes summing gradient magnitudes for edge pixels in the at least one frame of video data with respect to the at least one patch of changed pixels and characterizing objects in the video data as abandoned or removed based on a comparison of the sums of gradient magnitudes between the background model and the at least one frame.

In general, according to another aspect, the invention features a security system that includes cameras to capture video data and a network video recorder to store the captured video data. Additionally, the security system includes an analysis system to compare a background model to at least one frame of the video data to identify at least one patch of changed pixels between the background model and the at least one frames. The security system then generate masks based on the at least one patch of changed pixels that define contours around the at least one patch of changed pixels and applies the masks to the background model and the at least one frame to determine whether the at least one patch of changed pixels is characteristic of abandoned objects and/or removed objects.

In general, according to another aspect, the invention features a security system that includes cameras to capture video data and a network video recorder to store the captured video data. The security system includes an analysis system that compares a background model to at least one frame of the video data to identify at least one patch of changed pixels between the background model and the at least one frame. The analysis system then sums gradient magnitudes for edge pixels in the background model with respect to the at least one patch of changed pixels and sums gradient magnitudes for edge pixels in the at least one frame of video data with respect to the at least one patch of changed pixels. Next, the analysis system characterizes objects in the video data as abandoned or removed based on a comparison of the sums of gradient magnitudes between the background model and the at least one frame.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms of the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1A:
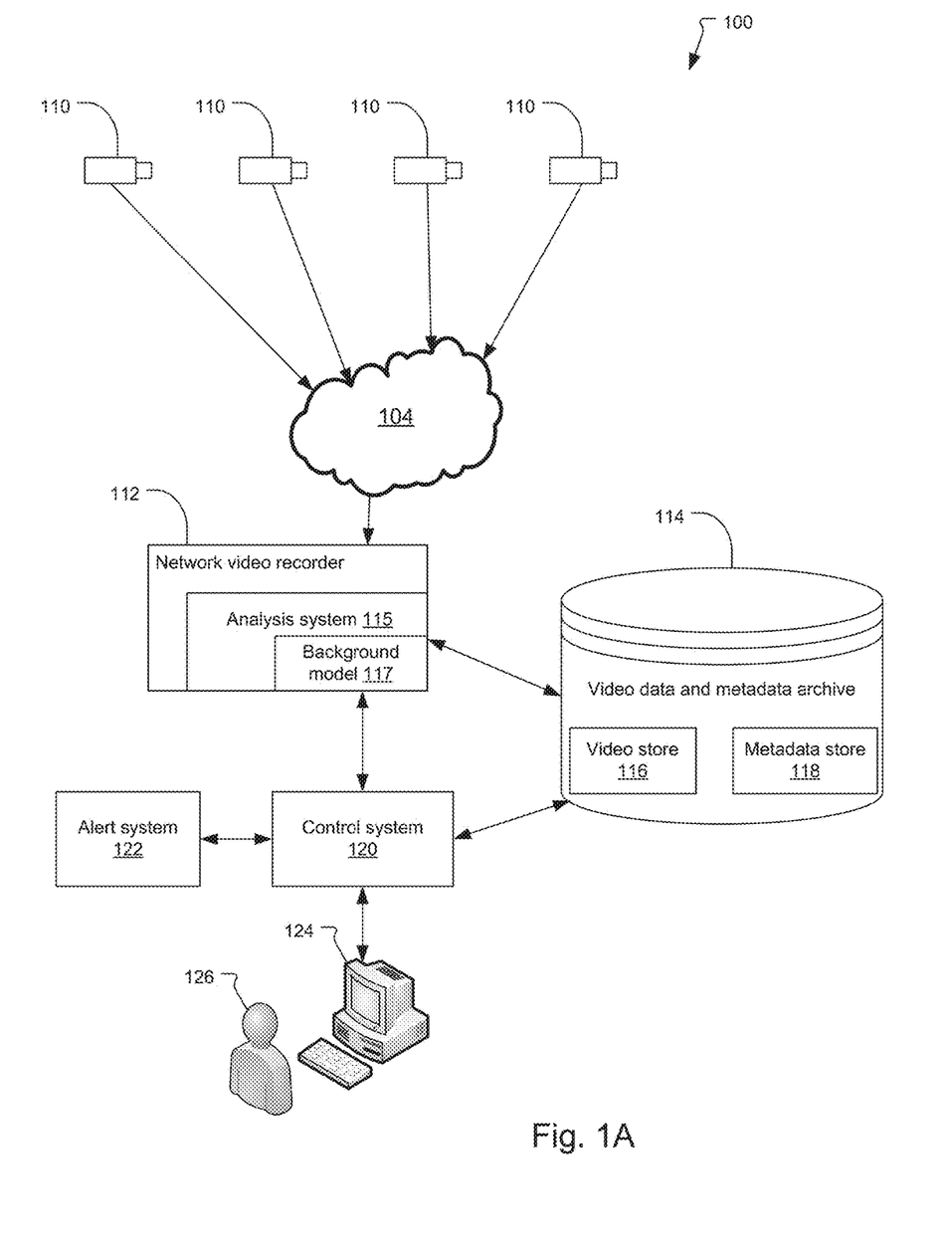
FIG. 1A is a block diagram showing a security system to which the present invention relates.
Figure 1B:
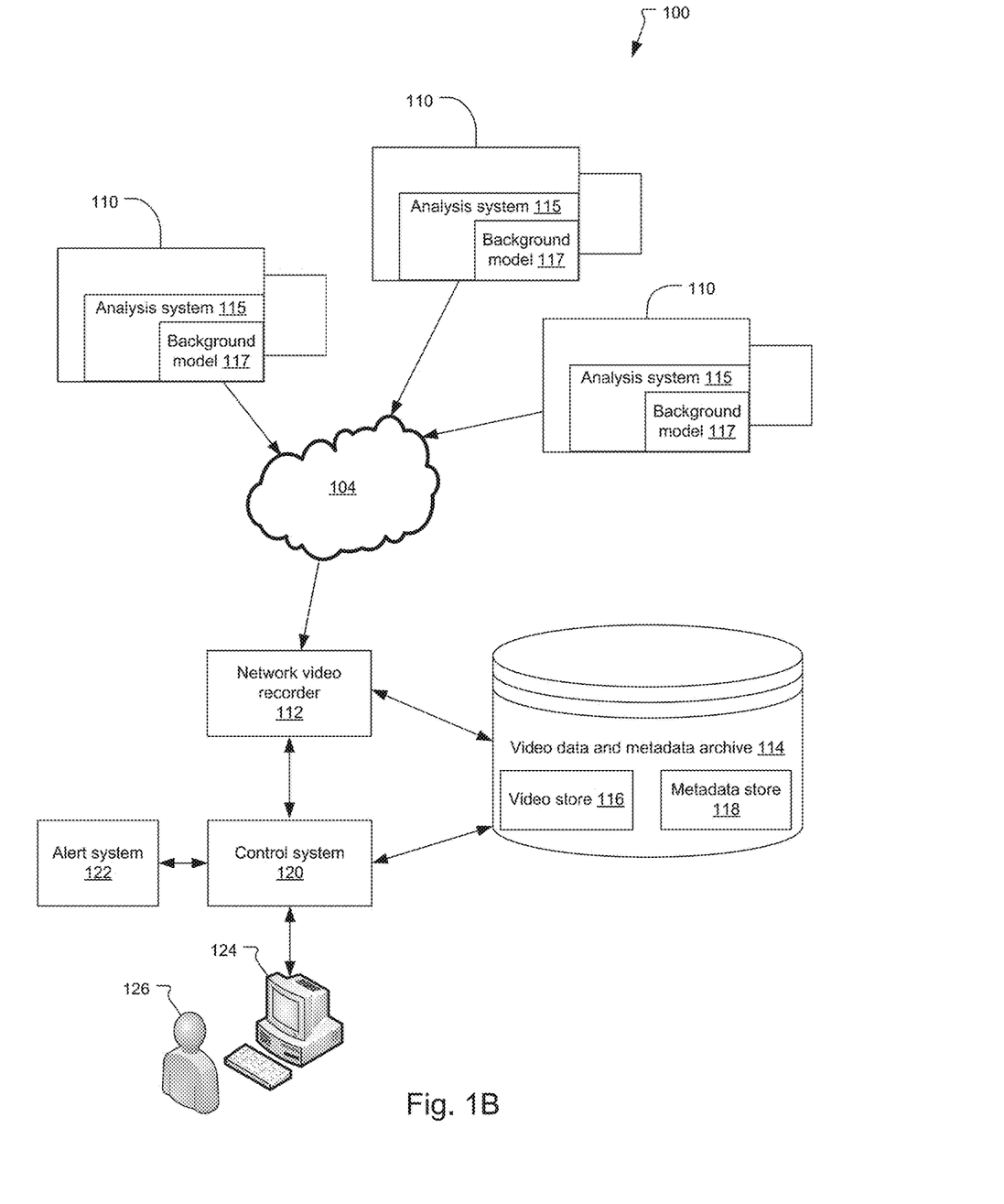
FIG. 1B is a block diagram showing a security system with another architecture to which the present invention also relates.
Figure 1C:
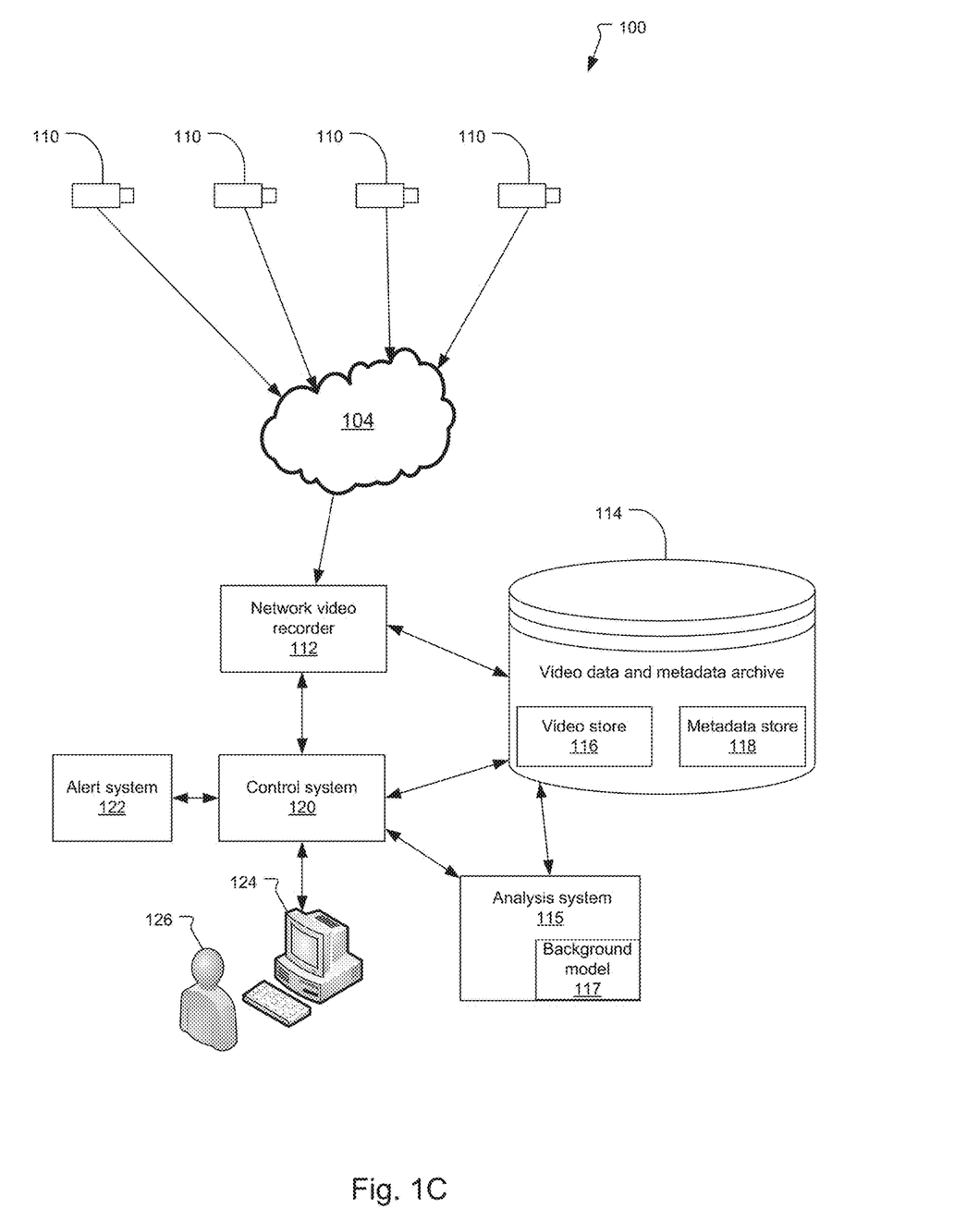
FIG. 1C is a block diagram showing a security system with still another architecture to which the present invention also relates.

FIGS. 1A, 1B, and 1C illustrate different embodiments of the video security system 100, which includes security cameras 110, a network video recorder 112, and a video data and metadata archive (or archive) 114.

The security system 100 includes one or more video cameras 110, which are connected to the network video recorder 112 via a network 104. Typically, the network 104 is a private network, such as a local area network provided within the building. In other embodiments, the network 104 includes a combination of private and/or public networks so that the video data from the security cameras 110 are able to be transmitted to the network video recorder system 112 from remote locations.

The network video recorder 112 stores the video data and any metadata in the archive 114. The metadata are data that describes the captured video data. For example, the metadata may include a camera identification number (or name), the locations of the camera in the building, its Internet Protocol address (when implemented on a data network), movement of foreground objects, and/or events of interest, to list a few examples. Generally, the archive 114 includes both a video store 116 that includes the raw video data from the cameras 110 and a metadata store 118 for storing metadata associated with the captured video data.

The video data generated by the security cameras 110 are analyzed by an analysis system 115. This analysis system 115 generates the metadata from the video data captured by the security cameras 110. The security system 100 stores the metadata associated with the video data in the metadata store 118 so that security personnel 126 and/or users are able to search through the video data for specific events in the archived video data later. The security personnel search for objects being abandoned in the scene or objects being removed from the scene, in two examples.

In a typical implementation, the network video recorder 112 is also connected to a control system 120, which is typically housed in a security room of the building. However, the security room could also be security booth or located offsite, to list a few examples. In the illustrated example, the control system 120 communicates with an alert system 122, which generates alerts based on the metadata indicating abandoned or removed objects. In further aspects, the alerts are based on user parameters (e.g., such as during certain time periods) or based on changes detected in specific regions within the field of view captured by the security cameras 110.

In the illustrated example, the security system 100 is monitored and/or controlled by the security personnel 126 with a workstation 124. In the illustrated example, the security personnel 126 is a single security guard.

There are multiple ways that the analysis system 115 can be deployed within the security system 100. Some examples of possible deployments are illustrated in FIGS. 1A, 1B, and 1C.

As illustrated in FIG. 1A, the analysis system 115 is implemented within the network video recorder 112. In this example, the video data from the security cameras 110 are received over the network 104 at the video recorder 112. The analysis system 115 is usually a process that runs on the network video recorder 112 or a separate system implemented on an interface to the network video recorder 112.

In a typical implementation a background model 117, which is generated by the analysis system, is stored (non-permanently) in a processing pipeline of the analysis system 115. Additionally, the background model 117 is continually updated as frames of the video data are processed by the analysis system 115.

As illustrated in FIG. 1B, the analysis system 115 is part of the individual security cameras 110 in another configuration. Here, the analysis of video data is performed within the security cameras 110. The video data and metadata are then transmitted over the network 104 to the network video recorder 112, which then stores the video data and associated metadata in the archive 114.

FIG. 1C illustrates yet another example. Here, the analysis system 115 is a separate system that processes the video data stored in archive 114. In this example, the video data captured by the security cameras 110 are stored to the archive 114. Then, the analysis system 115 accesses that video data from the archive 114, generates the associated metadata, and stores the metadata back into the metadata store 118 of the archive 114. The video data and metadata are typically correlated to each other via timestamps and camera identifiers stored with the metadata. This enables the video data and metadata to also be correlated with the particular video camera 110 and event that gave rise to the metadata 118.

In some examples, all of the video data generated by the video cameras 110 are stored in the video store 116 of the archive 114. In other examples, video data are only stored when the analysis system 115, upon analyzing that video data, determines that an event of interest occurred and that the video should be stored.

FIGS. 1A-1C illustrate three different embodiments of the security system 100. However, the security system could be embodied in many other configurations and should not be limited to the illustrated examples. For example, in another embodiment of the security system 100, the analysis system 115 is a network node that is different from the network video recorder 112.

Figure 2:
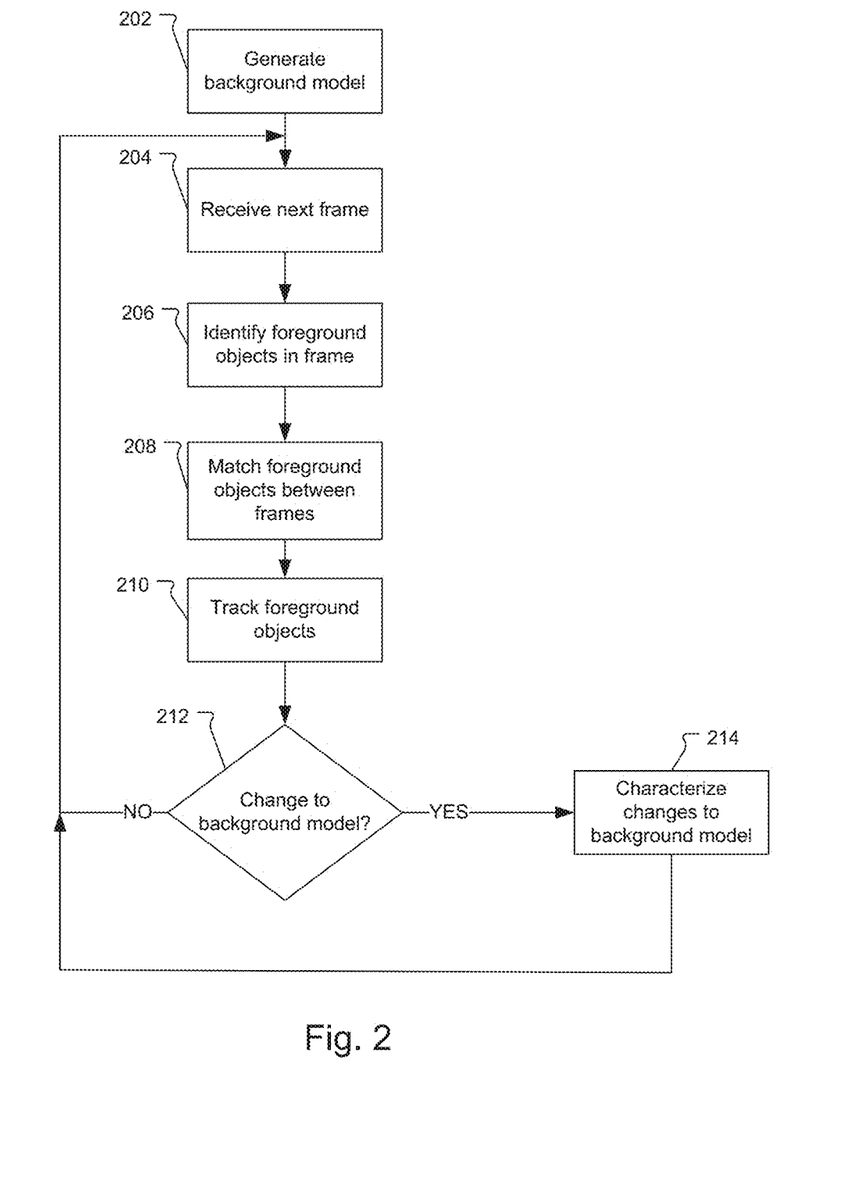
FIG. 2 is a flowchart illustrating the steps performed by the analysis system of the security system to analyze frames of video data captured by security cameras.

FIG. 2 is flowchart illustrating the steps performed by the analysis system 115 of the security system 100 to analyze frames of video data captured by the security cameras 110.

In the first step 202, the background model is generated. In a typical implementation, the analysis system 115 analyzes the video data from the security cameras 110 to generate the background model of the respective areas being monitored. The background model is the stationary portion of a scene being monitored by each security camera 110 and is generally only updated slowly and is based on one or more frames of video data.

In the next step 204, the analysis system 115 receives a next frame of video data from the security cameras 110. In step 206, the analysis system 115 identifies foreground objects in the received frame. And, the analysis system 115 matches foreground objects between successive frames of the video data in step 208. In the next step 210, foreground objects are tracked to monitor how the foreground objects move and interact within the scene. In a typical implementation, the foreground objects are identified with bounding boxes and unique identifiers and stored as metadata as they move within the scene.

In the next step 212, the analysis system 115 determines if there are any changes to the background model. If there is no change to the background model, then the analysis system 115 continues to analyze frames of video data and track foreground objects. If there are changes to the background model, then the analysis system 115 characterizes the changes to the background model in step 214 such as whether objects have been abandoned in the scene or removed from the scene.

Figure 3:
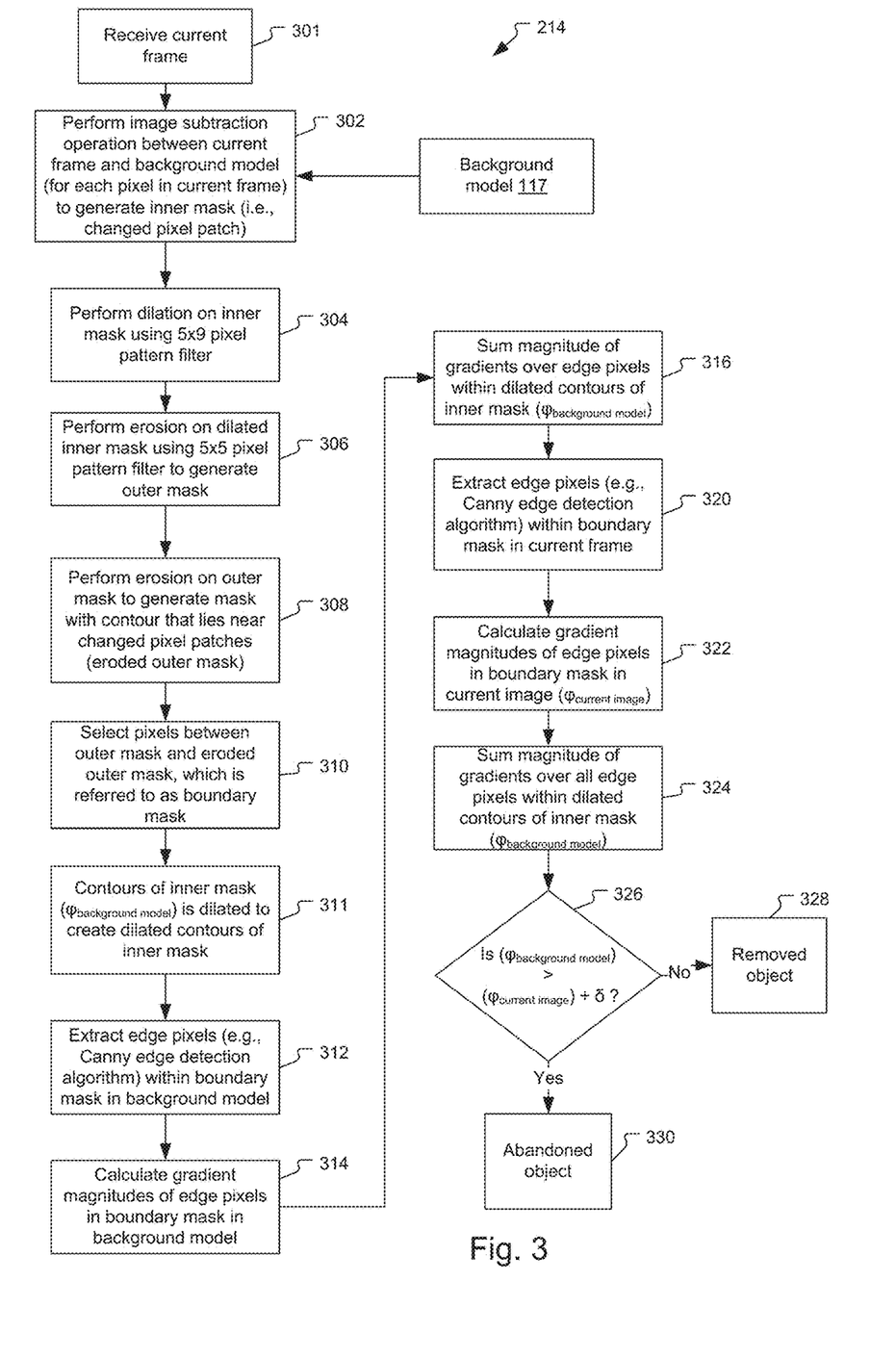
FIG. 3 is a flow chart illustrating the steps performed by the analysis system to characterize background objects as abandoned or removed.

FIG. 3 is a flow chart illustrating the steps performed by the analysis system 115 to characterize the objects as abandoned or removed according to a first embodiment.

In general, the analysis system 115 compares the background model to at least one current frame by performing an image subtraction operation to identify at least one patch of changed pixels (or changed pixel patches). The image subtraction operation may identify a single changed pixel patch or a multiple patches of changed pixels. Next, the analysis system 115 uses morphological image processing (e.g., erosion, dilation, open, close) to generate masks based on the changed pixel patches. The erosion operation uses a structuring element to remove (i.e., erode) boundary regions in a group of pixels. The dilation operation uses the structuring element to increase boundary regions in a group of pixels. Similar or different structuring elements may be used to perform the erosions and dilations. The open operation is an erosion operation followed by the dilation operation (using the same structuring element). The close operation is a dilation operation followed by the erosion operation (using the same structuring element).

The analysis system 115 then applies the masks to the background model and the current frames to determine whether the changed pixel patches are characteristic of abandoned or removed objects.

In the first step 301, the analysis system 115 receives a current frame of the video data from one of the security cameras 110. In the next step 302, the analysis system 115 performs an image subtraction operation between the current frame and background model 117 (for each pixel in current frame) to generate an inner mask (i.e., changed pixel patch).

The analysis system 115 then performs a dilation on the inner mask using a 5×9 pixel pattern filter in step 304, which is also referred to as the structuring element. The pixel pattern filter can vary in size and shape. For example, the pixel pattern filter could be square, rectangular, triangular, diamond, or circular, to list a few examples. The different shapes and sizes of the pixel pattern filter will affect the result of the morphological operation applied to the image.

The analysis system 115 then performs an erosion on the dilated inner mask using a 5×5 pixel pattern filter to generate an outer mask in step 306. As in step 304, the pixel pattern filter applied on the dilated inner mask can vary. Next, in step 308, an erosion is performed on the outer mask to generate a mask whose contour lies near the changed pixel patches. This is referred to as an eroded outer mask.

In step 310, the analysis system 115 selects pixels within the strip between the outer mask and the eroded outer mask, which is referred to as a boundary mask. The contours of the inner mask ($\varphi_{background\ model}$) are dilated to create the dilated contours of the inner mask in step 311. The analysis system 115 then extracts edge pixels (e.g., Canny edge detection algorithm) within the boundary mask in the background model in step 312.

Gradient magnitudes of edge pixels in the boundary mask in the background model 117 are calculated in step 314, and in step 316, the analysis system 115 sums a magnitude of gradients over all the edge pixels within the dilated contours of the inner mask ($\varphi_{background\ model}$) computed in step 311.

The analysis system 115 extracts edge pixels (e.g., Canny edge detection algorithm) within the boundary mask in the current frame in step 320.

In the next step 322, the analysis system 115 calculates gradient magnitudes of edge pixels in the boundary mask in the current image. In step 324, the analysis system 115 sums a magnitude of gradients over all the edge pixels within the dilated contours of the inner mask ($\varphi_{background\ model}$) computed in step 311.

The analysis system 115 determines if $\varphi_{background\ model}$ is greater than $\varphi_{current\ image}$ by a threshold ($\delta$). If $\varphi_{background\ model}$ is greater than $\varphi_{current\ image}+\delta$, then the object is characterized as abandoned in step 330. If $\varphi_{background\ model}$ is not greater than $\varphi_{current\ image}+\delta$, then the object is characterized as removed in step 328.

Figure 4:
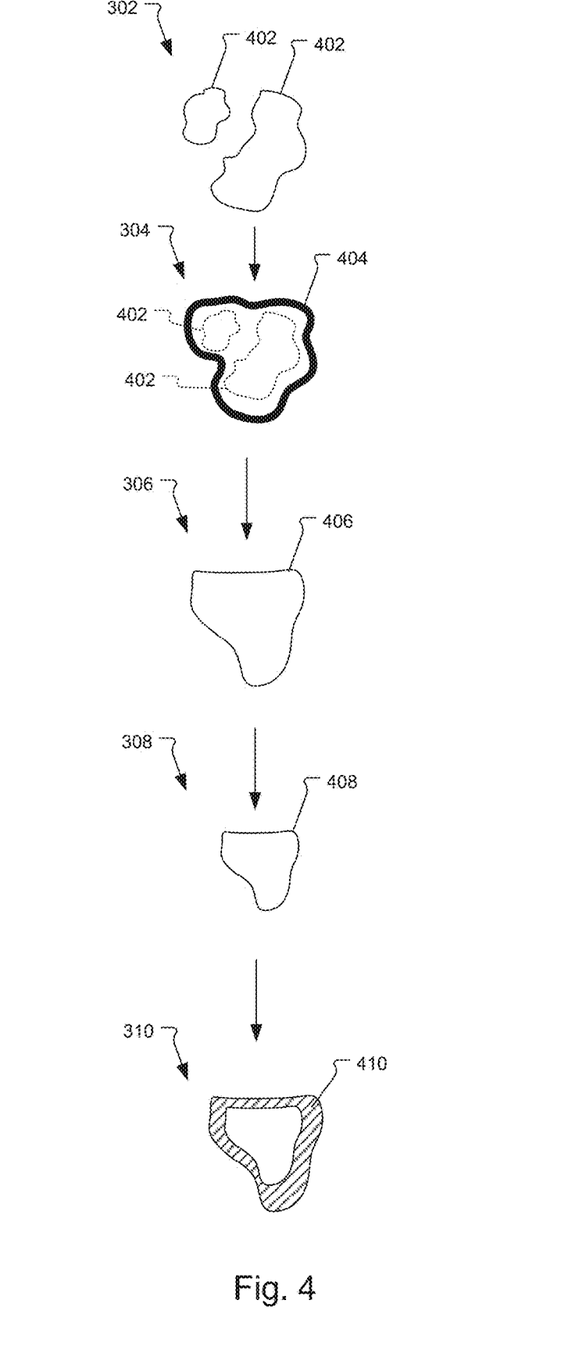
FIG. 4 illustrates how the inner mask is modified by the image processing steps.

FIG. 4 illustrates an example of how the inner mask 402 is modified with morphological image processing.

The inner mask 402 is generated by the image subtraction operation (performed in step 302 in FIG. 3). In the next step (step 304), the contour of the inner mask is dilated, which is referred to as the dilated inner mask contour 404, using a 5×9 pixel pattern filter. The dilated inner mask contour 404 is then eroded with a 5×5 pixel pattern filter (step 306) to yield the outer mask 406. The outer mask 406 is eroded to yield the eroded outer mask 408 (step 308). The result is a strip of pixels 410, referred to as the boundary mask, between the outer mask 406 and eroded outer mask 408.

Figure 5:
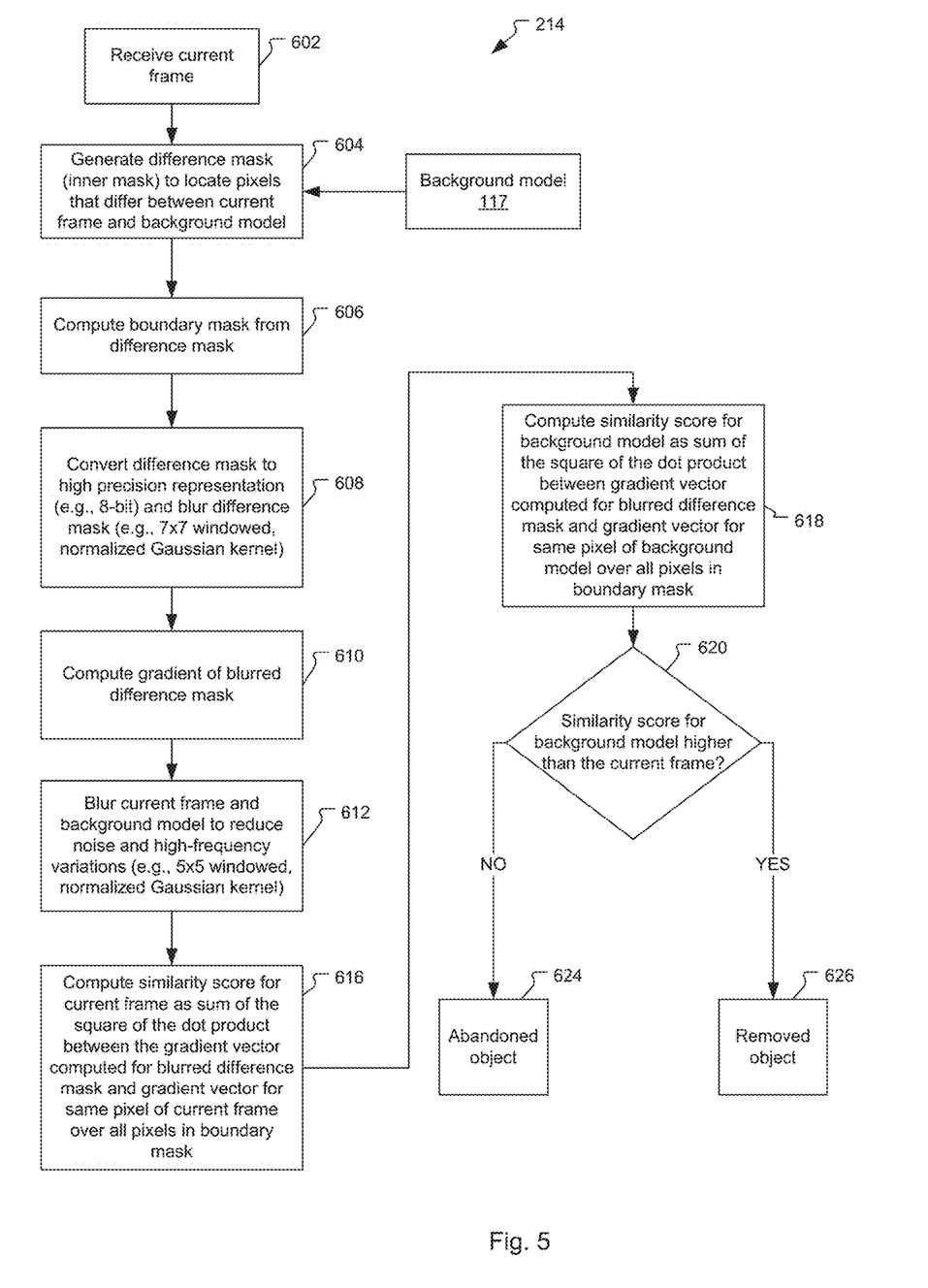
FIG. 5 is an alternative embodiment of how the analysis system characterizes background objects as abandoned or removed.

FIG. 5 is an alternative embodiment of how the analysis system 115 characterizes changes to the background model for step 214 and classifies objects as abandoned or removed.

In the first step 602, the analysis system 115 receives a current frame of the video data from the security cameras 110. In the next step 604, a difference mask (e.g., inner mask) is generated to locate pixels that differ between the received current frame and the background model 117. In a typical implementation, the difference mask is a binary image, which indicates pixels that differ between the current frame and the background model 117.

The analysis system 115 then computes a boundary mask from the difference mask in step 606. In a preferred embodiment, the boundary mask is computed by locating pixels for which 3-6 elements are inside the difference mask, when analyzing each of the pixels and its eight adjacent neighbor pixels. Thus, the boundary mask defines a contour around the at least one patch of changed pixels. Alternatively, other methods for computing the boundary mask may also be implemented.

In the next step 608, the analysis system 115 converts the difference mask to high precision representation (i.e., 8-bit) and blurs the difference mask, for example by using a 7×7 windowed, normalized Gaussian kernel. Next, in step 610, the gradient of the blurred difference mask is computed. The analysis system 115 then blurs the current frame and the background model 117 to reduce noise and high-frequency variations, for example by using a 5×5 windowed, normalized Gaussian kernel in step 612.

Next in step 616, the analysis system 115 computes a similarity score for the current frame as the sum of the square of the dot product between the gradient vector computed for the blurred difference mask (i.e., step 610) and the gradient vector for the same pixel of the current frame over all pixels in the boundary mask (computed in step 606).

Next in step 618, the analysis system 115 computes a similarity score for the background model as the sum of the square of the dot product between the gradient vector computed for the blurred difference mask (i.e., step 610) and the gradient vector for the same pixel of the background model over all pixels in the boundary mask (computed in step 606).

If the similarity score for the background model is higher than the current frame, then the analysis system 115 characterizes the object as removed in step 626. If the similarity score for the background model is lower than the current frame, then the analysis system 115 characterizes the object as abandoned in step 624.

Figure 6A:
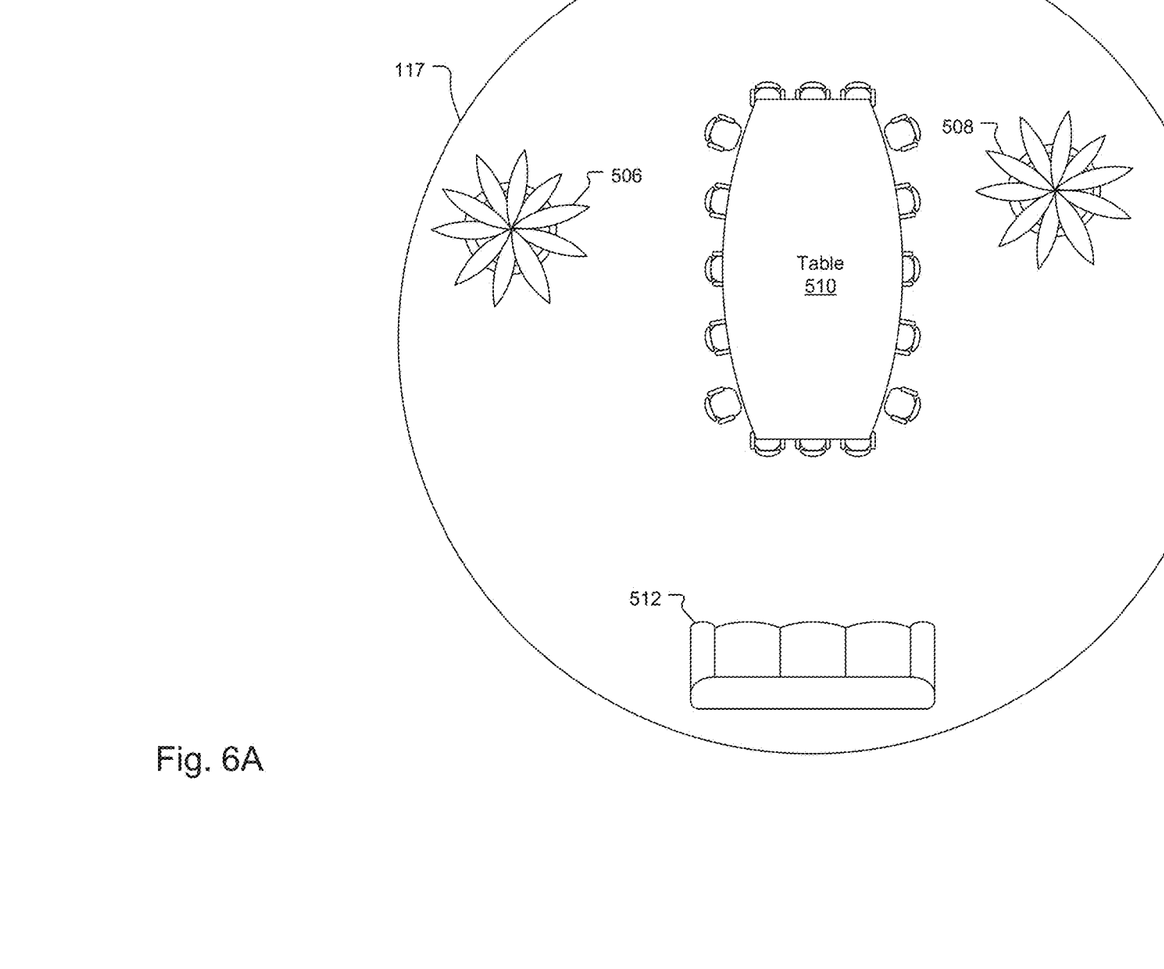
FIG. 6A illustrates a background model image.
Figure 6B:
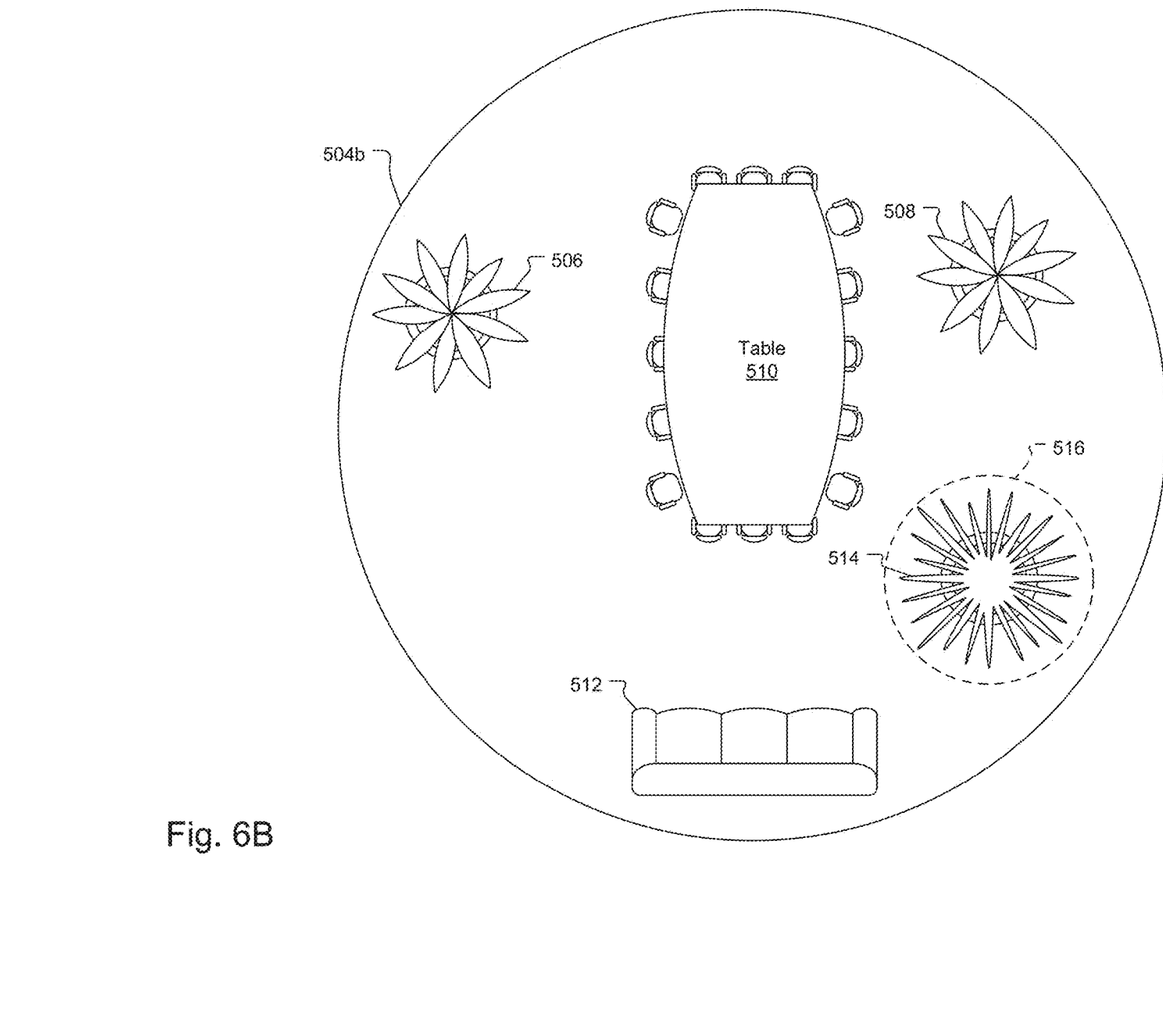
FIG. 6B illustrates an object being abandoned.
Figure 6C:
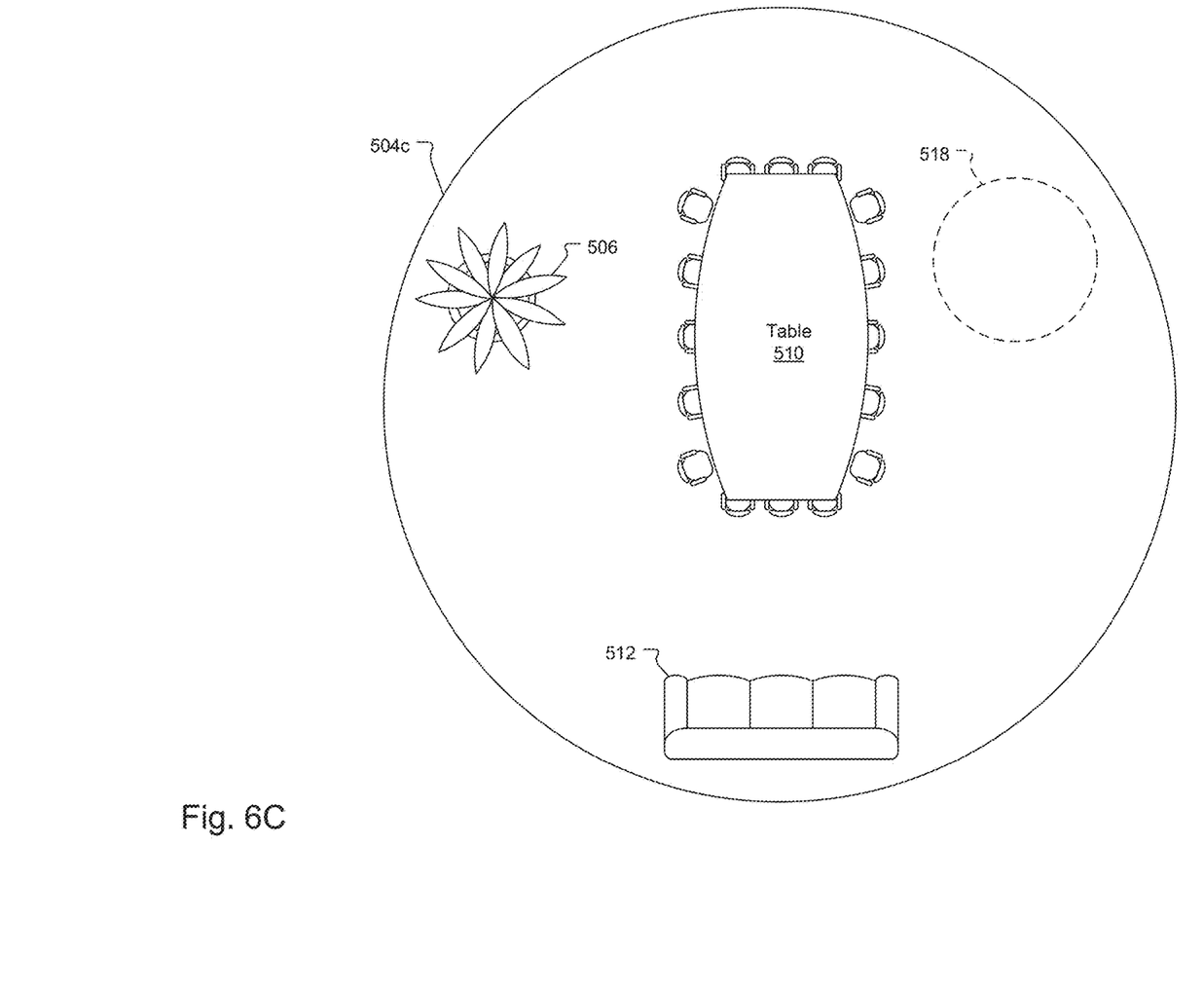
FIG. 6C illustrates an object being removed.

FIGS. 6A-6C illustrate objects being abandoned or removed from a scene. In general, FIG. 6A illustrates a background model, FIG. 6B illustrates an object being abandoned, and FIG. 6C illustrates an object being removed.

In general, in the case of an abandoned object, the contour of the changed pixel patch more closely resembles edges detected in the current image. On the other hand, in the case of a removed object, the contour of the changed pixel patch more closely resembles edges detected in the background model image.

FIG. 6A illustrates the background model 117. In the illustrated example, the background model includes a first plant 506, a second plant 508, a table 510, and a sofa 512.

FIG. 6B illustrates a frame 504b of video data received from one of the security camera 110. In this frame, a third plant 514 has been abandoned (added) to the background. The abandoned third plant 514 creates a changed pixel patch (i.e., area 516) around the region where the third plant 514 was abandoned. In this example, the contour of the changed pixel patch will more closely resemble edges detected in the current image.

FIG. 6C illustrates an alternative example of a frame 504c of video data received from one of the security cameras 110. In this frame, the second plant 508 has been removed. The removal of the second plant 508 creates a changed pixel patch (i.e., area 518) where the plant was previously located. In this example, the contour of the changed pixel patch will more closely resemble edges detected in the background model image.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for analyzing video data in a security system, the method comprising:
    comparing a background model to video data to identify at least one patch of changed pixels between the background model and the video data;
    generating masks based on the at least one patch of changed pixels that define contours around the at least one patch of changed pixels; and
    applying the masks to the background model and the video data to determine whether the at least one patch of changed pixels is characteristic of an abandoned object or a removed object.

2. The method according to claim 1, further comprising computing a similarity score for the video data as a sum of the square of dot product between a gradient vector computed for a blurred mask and a gradient vector for the video data over border pixels of the patch of changed pixels.

3. The method according to claim 1, further comprising computing a similarity score for the background model as a sum of the square of dot product between a gradient vector computed for a blurred mask and a gradient vector for the background model over border pixels of the patch of changed pixels.

4. The method according to claim 1, further comprising associating metadata with the at least one frame and creating alerts based on the metadata.

5. The method according to claim 1, further comprising performing morphological image processing on the at least one patch of changed pixels.

6. The method according to claim 5, wherein the morphological image processing includes dilations.

7. The method according to claim 5, wherein the morphological image processing includes erosions.

8. The method according to claim 1, further comprising extracting edge pixels in the background model and the video data with an edge detection algorithm.

9. The method according to claim 8, further comprising calculating gradient magnitudes of the extracted edge pixels in the background model and the video data.

10. The method according to claim 9, further comprising summing gradient magnitudes of all edge pixels in the background model and the video data.

11. The method according to claim 1, further comprising blurring the video data and background model to reduce noise and variations.

12. The method according to claim 1, further comprising converting the mask to a high precision representation.

13. The method according to claim 1, further comprising continually updating the background model based determination of abandoned objects and/or removed objects.

14. A method for analyzing video data in a security system, the method comprising:
    comparing a background model to the video data to identify at least one patch of changed pixels between the background model and the video data;
    summing gradient magnitudes for edge pixels in the background model with respect to the at least one patch of changed pixels;
    summing gradient magnitudes for edge pixels in the video data with respect to the at least one patch of changed pixels; and
    characterizing objects in the video data as abandoned or removed based on a comparison of the sums of gradient magnitudes between the background model and the video data.

15. The method according to claim 14, further comprising continually updating the background model based determination of the abandoned objects and/or the removed objects.

16. The method according to claim 15, wherein the background model is temporarily stored in a processing pipeline.

17. The method according to claim 14, further comprising associating metadata with the video data and creating alerts based on the metadata.

18. The method according to claim 14, further comprising performing morphological image processing on the at least one patch of changed pixels.

19. The method according to claim 18, wherein the morphological image processing includes dilations.

20. A security system comprising:
    video cameras to capture video data;
    a video recorder to store the captured video data;
    an analysis system that analyzes the video data of the security system; and
    wherein the analysis system compares a background model to the video data to identify at least one patch of changed pixels between the background model and the video data, generates masks based on the at least one patch of changed pixels, which define contours around the at least one patch of changed pixels, applies the masks to the background model and the video data, and determines whether the at least one patch of changed pixels is characteristic of abandoned objects or removed objects.

* * * * *